United States Patent [19]

Du Vernet

[11] Patent Number: 4,725,384

[45] Date of Patent: * Feb. 16, 1988

[54] METHOD FOR ROSIN ESTERIFICATION IN THE PRESENCE OF PHOSPHINIC ACID AND PHENOL SULFIDE AND SUBSEQUENT NEUTRALIZATION WITH A MAGNESIUM SALT

[75] Inventor: Richard B. Du Vernet, Isle of Palms, S.C.

[73] Assignee: Westvaco Corporation, New York, N.Y.

[ * ] Notice: The portion of the term of this patent subsequent to Mar. 17, 2004 has been disclaimed.

[21] Appl. No.: 931,404

[22] Filed: Nov. 17, 1986

[51] Int. Cl.$^4$ .................. C09F 1/04; C09F 1/00; C08L 23/00

[52] U.S. Cl. .................. 260/104; 260/108; 260/109; 524/272

[58] Field of Search .............. 260/104, 108, 109; 524/272

[56] References Cited

U.S. PATENT DOCUMENTS

| | | | |
|---|---|---|---|
| 3,377,334 | 4/1968 | McBride et al. | 260/108 |
| 3,780,013 | 12/1973 | Smith | 260/97.5 |
| 3,784,537 | 1/1974 | Scharrer | 260/97.5 |
| 4,548,746 | 10/1985 | Duncan et al. | 260/104 |
| 4,643,848 | 2/1987 | Thomas et al. | 260/104 |
| 4,650,607 | 3/1987 | Lampo et al. | 260/104 |

*Primary Examiner*—Harold D. Anderson
*Assistant Examiner*—Dennis R. Daley
*Attorney, Agent, or Firm*—Terry B. McDaniel; Richard L. Schmalz

[57] ABSTRACT

The treatment of a rosin ester prepared by reacting rosin and a polyhydric alcohol in the presence of a catalytic combination of phosphinic acid (also called hypophosphorous acid) and a phenol sulfide compound with a magnesium salt of an organic acid is disclosed to improve the clarity and viscosity stability of hot melt adhesives when used as a tackifier in the adhesive formulation. According to the process of the invention, a rosin is reacted with up to a 50% equivalent excess of the polyhydric alcohol in the presence of phosphinic acid and a phenol sulfide compound at a temperature of from about 180° C. to about 300° C. and the reaction product is treated subsequently with from 0.01% to 5.0% of a magnesium salt of an organic acid.

31 Claims, No Drawings

METHOD FOR ROSIN ESTERIFICATION IN THE PRESENCE OF PHOSPHINIC ACID AND PHENOL SULFIDE AND SUBSEQUENT NEUTRALIZATION WITH A MAGNESIUM SALT

BACKGROUND OF THE INVENTION

1. Field of the Invention

This invention relates to an improved method of preparing esters of rosin. In particular, this invention relates to an improved rosin-polyol ester prepared by reacting rosin and a polyhydric alcohol in the presence of phosphinic acid ($H_3PO_2$) and a phenol sulfide compound, as combined catalyst, wherein the acidity in the product ester is neutralized with a magnesium salt. Most particularly, the invention relates to employing the rosin ester as a tackifier in ethylene-vinyl acetate based hot melt adhesives to produce hot melts of improved clarity and viscosity stability.

2. Description of the Prior Art

Rosin is mainly a mixture of $C_{20}$, fused-ring, monocarboxylic acids, typified by levopimaric and abietic acids, both of which are susceptible to numerous chemical transformations. The rosins to which this invention relates include gum rosin, wood rosin, and tall oil rosin or the rosin acids contained therein as for example, abietic acid, pimaric acid, sapinic acid, etc.

The natural separation and gradual conversion of some of the hydrophilic components of sap and related plant fluids from the cambium layer of a tree into increasingly hydrophobic solids are the generic process of forming diverse gums, resins and waxes. The oleoresin intermediate in this process is typified in pine gum, which flows from hacks on the trunks of southern yellow pine in southeastern United States, in France, and in other countries. Pine gum contains about 80% (gum) rosin and about 20% turpentine.

Resinification from oleoresin can result from either natural evaporation of oil from an extrudate or slow collection in ducts in sapwood and heartwood. Pinus stumps are valuable enough to be harvested, chipped, and extracted with hexane or higher-boiling paraffins to yield wood rosin, wood turpentine, and other terpene-related compounds by fractional distillation. In the kraft, i.e., sulfate, pulping process for making paper, pinewood is digested with alkali producing crude tall oil and crude sulfate turpentine as by-products. Fractionation of the crude tall oil yields tall oil rosin and fatty acids.

The chemical transformation of gum, wood, and tall oil rosin which relates to this invention is esterification. The beneficial product characteristics provided by rosin esterification for various applications have led to the development of many esterification procedures, particularly treatments with polyhydric alcohols. U.S. Pat. Nos. 2,369,125, 2,590,910 and 2,572,086 teach rosin esterification with glycerol and pentaerythritol, among other polyhydric alcohols, usually preceded by a rosin disproportionation step.

Commonly assigned U.S. Pat. No. 4,548,746 teaches the use of phosphinic acid (also called hypophosphorous acid) as a catalyst in the esterification of rosin with pentaerythritol to produce a rosin ester without appreciable color degradation. Also commonly assigned U.S. Pat. No. 4,650,607 discloses a method for rosin esterification in the presence of phosphinic acid and a phenol sulfide compound, as combined catalyst, to provide an ester of improved color and oxidation stability.

Hot melt adhesives based on ethylene-vinyl acetate (EVA) may contain 25-65% rosin-polyol ester as the tackifier. The compatibility of ester with the other hot melt components depends on the polyol, catalysts, additives and process used in making the ester. Good compatibility is indicated if the hot melt formulates clear and remains free of haze during thermal aging. The viscosity stability of the hot melt also is affected by the components and process used to make the ester. What gives good hot melt compatibility may give poor hot melt viscosity stability and vice versa.

The commercial EVA-based hot melt adhesive formulation which follows (designated as Formula A) is of relatively low polarity and is sensitive to variations in rosin ester tackifier compatibility.

| Formula A | |
|---|---|
| 35-45% | Tall oil rosin-pentaerythritol ester |
| 25-40% | EVA copolymer (with a vinyl acetate content of 17.5-18.5% and a melt index of 136-165) |
| 10-25% | Synthetic wax (with a congealing point of 204-208° F.) |

The commercial EVA-based hot melt adhesive formulation which follows (designated as Formula B) is of relatively high polarity and is sensitive to variations in viscosity stability.

| Formula B | |
|---|---|
| 45-60% | Tall oil rosin-pentaerythritol ester |
| 20-40% | EVA copolymer (with a vinyl acetate content of 27-29% and a melt index of 22-28) |
| 10-25% | Microcrystalline wax (with a melting point of 182° F.) |
| ~.5% | Antioxidant |

In the case of the low-color pentaerythritol ester wherein phosphinic acid together with a phenol sulfide compound catalyzes, bleaches, and stabilizes the product, the ester has excellent compatibility in a wide range of EVA-based hot melts if the acidity in the product is not neutralized, but the viscosity stability is very poor due to acid-catalyzed degradation of the EVA. Acceptable viscosity stability is achieved by neutralizing the ester with inorganic bases such as the alkali metal hydroxides so that the pH value of the ester, as measured in a 2:3 (volume:volume) mixture of methanol and toluene, is between about 6 and about 8. For example, U.S. Pat. No. 4,548,746 teaches neutralization with sodium hydroxide. However, the neutralized esters produce hazy hot melts either upon formulation or after thermal aging. While the cause of this hazing is not understood entirely, it is suspected that it may be due to the separation of inorganic salts of catalyst residues. Some improvement is obtained by neutralizing with calcium acetate, but haze still is observed even in more polar EVA hot melts with higher levels of vinyl acetate and is worse in non-polar hot melts. Organic amines can be used to neutralize the acidity, but they still give poor viscosity stability and may cause discoloration.

U.S. Pat. Nos. 4,168,253 and 4,284,543 teach the use of a lithium salt as an additive to the hydrocarbon tackified EVA-based hot melt adhesive compositions to extend the molten stability. However, as noted in the examples to follow, lithium hydroxide provides no improvement when employed as the ester neutralizing agent in the present invention.

The object of this invention, therefore, is to provide novel esters of rosin for use in hot melt adhesives, particularly ethylene-vinyl acetate based hot melts. It is a further object of this invention to employ an acidity neutralizing agent for certain rosin esters which makes the ester compatible as a tackifier for hot melt adhesives, reducing the degree of hazing during formulation or during thermal aging of the hot melt. It is a still further object of this invention to provide a compatible tackifier for hot melt adhesives which gives good viscosity stability to the hot melt. It is a specific object of this invention to provide a novel method of preparing esters of rosin exhibiting excellent compatibility and viscosity stability when employed as a tackifier for hot melt adhesives, particularly for ethylene-vinyl acetate based hot melts.

SUMMARY OF THE INVENTION

All of the above objects are met in the discovery that neutralizing a rosin ester prepared according to the process like that disclosed and claimed in U.S. Pat. No. 4,650,607 with a magnesium salt of an organic acid dramatically improves the clarity of hot melt adhesives while providing improved viscosity stability over hot melts employing unneutralized rosin ester tackifiers and those neutralized with other inorganic bases at comparable levels of base. In particular, a rosin is reacted with at least an equivalent amount of a polyhydric alcohol, preferably pentaerythritol, in the presence of from 0.01% to 2.0% phosphinic acid and 0.05% to 1.0% of a phenol sulfide, based on the weight of the rosin, at a temperature of from about 180° C. to about 300° C. to produce a rosin ester. To the ester reaction product is added from 0.01% to 5.0% of a magnesium salt of an organic acid, based on the weight of the rosin, at from about 200° C. to about 250° C. as a neutralizing agent, after which the mixture is allowed to cool.

DESCRIPTION OF THE PREFERRED EMBODIMENT

Phosphinic acid is a strong, reducing acid, useful for its antioxidant or color-reducing properties in the preparation of light colored fatty acid taurates (U.S. Pat. No. 3,232,968), carboxylic acid esters with poly(oxyalkylene) compounds (British patent No. 979,673 and U.S. Pat. No. 3,071,604), acrylic and methacrylic esters of glycols (Japanese patent No. 73 11084), or in light colored alkyl resins (Japanese patent No. 12997). Also, phosphinic acid has been used as a tall oil treatment agent to convert the impurities and color bodies contained therein to a non-distillable form and to promote decarboxylation of rosin acids present (U.S. Pat. No. 2,441,197).

A rosin esterification process is provided in U.S. Pat. No. 4,650,607 involving the use of phosphinic acid in combination with a phenol sulfide compound as the esterification catalyst.

The gum, wood, and tall oil rosin materials to which this invention relates may be subjected to other treatments prior to esterification. For example, in addition to the distillation treatment alluded to in the fractionation extraction processes, the rosin material may have been subjected to disproportionation, hydrogenation, or polymerization, or some combination of these and/or other treatments.

As polyhydric alcohols, ethylene glycol, propylene glycol, diethylene glycol, triethylene glycol, tetraethylene glycol, trimethylene glycol, glycerol, pentaerythritol, dipentaerythritol, tripentaerythritol, trimethylolethane, trimethylolpropane, mannitol, sorbitol, as well as combinations of the aforementioned and other similar polyhydric alcohols may be used. The amount of the alcohol used in the esterification may be varied widely but generally no more than an approximate 50% excess over the equivalent combining proportion will be necessary.

In general, the esterification is effected by introducing the rosin, up to a 50% equivalent excess of a polyhydric alcohol, preferably 5-20% equivalent excess, and from 0.01% to 2.0% phosphinic acid, and from 0.05% to 1.0% phenol sulfide based on the weight of the rosin, into a reaction vessel. The reaction temperature is raised to from about 180° C. to about 300° C., preferably from about 250° C. to about 280° C., for up to about 15 hours or until the rosin acid number is reduced to about 15 or below. Longer reaction times may be employed, but the additional time and energy costs generally outweigh any benefits received. The preferred amount of phosphinic acid is from about 0.05% to about 0.5%, based on the weight of the rosin, and no benefit is seen to be derived in employing amounts of 0.5% or more of the phosphinic acid. The preferred amount of phenol sulfide is from about 0.2% to about 0.5%, based on the weight of the rosin.

The phenol sulfide is set forth in U.S. Pat. No. 3,780,013 which is incorporated by reference herein. As stated in the aforementioned patent, the treating agent may be represented by the structure:

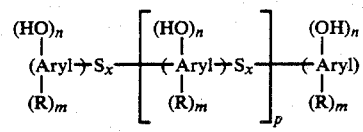

where n is an integer from 1 to 3 inclusive, p is an integer from 0 to 100 and preferably about 5 to 20 inclusive, and the sum of m and n on each aryl is between 1 and 5 inclusive, x is 1, 2, or 3, and R is a hydrocarbon group, e.g., alkyl cycloalkyl and substituted alkyl, e.g., $C_1$-$C_8$, wherein the substituents are cycloalkyl, aryl, alkaryl, and the like. R desirably contains from 1 to 22 carbon atoms inclusive. Preferred alkyl groups are straight chain secondary and tertiary alkyl groups containing up to 8 carbon atoms inclusive. Preferred aryl groups are those containing 6 to 18 carbon atoms, inclusive, typically phenyl, naphthyl and anthracyl. Typical cycloalkyl groups contain 3-8 carbon atoms in the ring, e.g., cyclopropyl, cyclopentyl and cyclohexyl.

Advantageously, the esterification reaction should be accomplished in the presence of an inert atmosphere, provided by a nitrogen purge on the reaction vessel prior to addition of the reactants and a nitrogen sparge during the reaction. Since light color is a desirable property of the rosin ester and the color is sensitive to oxygen exposure, such exposure should be minimized.

The magnesium salts of organic acids which are effective in neutralizing the acidity in the rosin ester product from the esterification reaction include the magnesium salts of the following organic acids: formic, adipic, acetic, proprionic, butyric, valeric, caproic, caprylic, lactic, capric, lauric, carbonic, citric, myristic, palmitic, stearic, oleic, linoleic, linolenic, benzoic, and phthalic. Included for the purposes of this invention in the definition of the magnesium salts of organic acids are magnesium oxide and magnesium hydroxide. Especially preferred among the above organic acids are the more volatile organic acids since the organic acid released during treatment of the ester with the magnesium salt can boil off, thereby maximizing the reduction of acidity.

In a preferred embodiment of the invention process, the rosin starting material is melted in an inert atmosphere in the reaction vessel. Subsequently, a total of about 0.1% to about 0.4% phosphinic acid (added as a 50% solution in water), based on the weight of the rosin, from about 0.15 to about 0.5% (based on the weight of the rosin) of a phenol sulfide, and 5–20% equivalent excess pentaerythritol are added. A very low inert gas sparge, such as nitrogen or carbon dioxide, is maintained as the mixture is heated to a temperature of from about 225° C. to about 250° C. with agitation, which temperature is maintained for about three hours. The reaction temperature then is increased to about 275° C. until the reaction product acid number is decreased to 15 or below, or for a time of about 2 to 12 hours. After about 5 to 15 hours from initiating the reaction, the inert gas sparge is replaced with a steam sparge which is maintained for from 0.5 to 10 hours. The mixture is cooled to from 200° C. to 250° C., followed by addition of about 0.25% solid magnesium acetate based on the weight of the starting rosin. The acid number at this point is normally below 10, but this is not a prerequisite. Finally, the mixture is sparged with nitrogen to remove all moisture. (In alternative preferred embodiments, the ester may be neutralized with an aqueous solution of magnesium acetate or with magnesium oxide in acetic acid which generates the acetate in situ.)

The following examples serve to illustrate the rosin esters made by the invention process, as well as the unexpected clarity and viscosity stability improvement in hot melt adhesives when the invention rosin esters are employed as the tackifier. Unless otherwise specified, the parts are by weight.

EXAMPLE 1

In a suitable reaction vessel a pentaerythritol (203 parts) ester of a tall oil rosin (1515) parts) with a U.S.-D.A. color of X was prepared according to the above-described preferred embodiment. A total of 3.8 parts of 50% active phosphinic acid and 3.8 parts of phenol sulfide were employed. The inert atmosphere was provided by a nitrogen sparge which was maintained as the mixture was heated to 230° C. with agitation. After maintaining this temperature for 3 hours, the reaction temperature was increased to about 275° C. and maintained until the acid number was below 15. The mixture was cooled to 260° C. and the nitrogen sparge was replaced with a steam sparge until the acid number reached 10. The mixture then was sparged again with nitrogen and cooled to 205° C. at which point 3.8 parts magnesium acetate tetrahydrate was added. The mixture was allowed to agitate to digest the salt and then cooled. The final ester had a U.S.D.A. color of X-C, Ring and Ball softening point of 98° C., and an acid number of 9.

EXAMPLE 2

For the purpose of comparison with magnesium acetate neutralization of the rosin ester, three additional reactions were carried out as in Example 1 except, after steam sparging, the mixture was cooled to 250° C. for neutralization of each reaction product with, respectively, lithium hydroxide, sodium hydroxide, and calcium acetate, in amounts equivalent to the amount of magnesium acetate added in Example 1. The higher neutralization temperature (than Example 1) was necessary due to the lower solubility of the agents employed. Lithium hydroxide (0.85 part) was added as a solid. Sodium hydroxide (1.41 parts) was added as a 50% aqueous solution. Calcium acetate (3.0 parts) was added as a 20% aqueous solution containing a small amount of acetic acid. In each instance the ester was stirred for 30 minutes and then cooled.

EXAMPLE 3

In order to compare the hot melt compatibility of the ester neutralized with magnesium acetate with that of esters neutralized with equivalent amounts of lithium hydroxide, sodium hydroxide and calcium acetate, respectively, and to that of the unneutralized ester, esters were formulated and aged in the ethylene-vinyl acetate (EVA) hot melt adhesive of relatively low polarity, designated above as Formula A.

In order to compare the hot melt viscosity stabilities for esters neutralized with magnesium acetate with esters neutralized with lithium hydroxide, sodium hydroxide, and calcium acetate and the unneutralized ester, esters were employed as the tackifier in the more polar hot melt adhesive formulation, designated above as Formula B.

In preparing both formulations (A and B) with each of the esters prepared in Examples 1 and 2, the wax was first melted with stirring in a beaker. The ester was added and melted to 160° C. The EVA copolymer was added next portion-wise and melted and stirred in at 175° C. until homogeneous. If used, the phosphite antioxidant was blended into the hot melt.

The hot melt adhesives were aged in open jars for hours at 175° C. in a forced air oven. The less polar formulation (Formula A) was observed for haze or other signs of uncompatibility at 24 hour intervals. The viscosities of the more polar formulations (Formula B) were determined at 0 hour and after 72 hours of aging using a Brookfield Thermoset Viscosmeter, and the percent change in viscosity was calculated. Compatibility and viscosity stability data are given in the following table.

TABLE

HOT MELT COMPATIBILITY AND VISCOSITY STABILITY

| Neutralizing Agent | Compatibility | | | | Viscosity Stability (% Change) |
|---|---|---|---|---|---|
| | 0 Hr. | 24 Hr. | 48 Hr. | 72 Hr. | 72 Hr. |
| Lithium Hydroxide | *Cloudy | Cloudy | Cloudy | Cloudy | 63 |
| Sodium Hydroxide | Cloudy | Cloudy | Cloudy | Cloudy | 46 |
| Calcium Acetate | **Hazy | Hazy | Cloudy | Cloudy | 39 |
| Magnesium Acetate | Clear | Clear | Slightly Hazy | Hazy | 26 |
| Unneutralized | Clear | Clear | Clear | Clear | 300 (Gel) |

*cloudy = opaque
**hazy = translucent

The results indicate that neutralization with magnesium acetate gives a striking improvement in compatibility and improved viscosity stability relative to the other neutralizing agents. The unneutralized ester has excellent compatibility but very poor viscosity stability. That the improvement in viscosity stability was due to the effect of changing the neutralizing agent is shown by the fact that none of the neutralized esters produced significant skinning or gelling.

In the more polar formulation, ester neutralized with magnesium acetate also gives superior compatibility. Hot melts remain clear and bright over the entire test period while those neutralized with calcium, lithium and sodium salts induce some haze formation with aging. The result of the comparison of calcium acetate and magnesium acetate was unexpected, considering how similar is the chemistry of these two alkaline earth metals.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

What is claimed is:

1. In a process for esterifying rosin with a polyhydric alcohol which comprises heating the rosin in combination with polyhydric alcohol in the presence of a catalytic amount of phosphinic acid and a phenol sulfide compound in an inert environment, the improvement wherein the esterified rosin is subsequently treated with an amount of a magnesium salt of an organic acid to effectively neutralize the acidity contained therein.

2. The process of claim 1 wherein the reaction is conducted in an inert environment for from 5 to 15 hours at from 180° C. to 300° C. in the presence of 0.01% to 2.0% phosphinic acid, based on the weight of the rosin and 0.05% to 1.0% of a phenol sulfide compound, based on the weight of the rosin, followed by a steam sparge and addition of from 0.01% to 5.0% of a magnesium salt of an organic acid.

3. The process of claim 2 wherein the reaction is first heated to a temperature of from 225° C. to 250° C. and held for about three hours, after which the reaction temperature is increased to about 275° C. and held for from about two to about twelve hours prior to the steam sparge.

4. The process of claim 1 wherein the rosin is esterified with up to 50% excess equivalent of the polyhydric alcohol, over the rosin, at from 250° C. to 280° C.

5. The process of claim 1 wherein the rosin is selected from the group consisting of tall oil rosin, gum rosin and wood rosin.

6. The process of claim 1 wherein the rosin esterification is preceded by a rosin pretratment step selected from the steps consisting of disproportionation, hydrogenation, polymerization, distillation, and a combination thereof.

7. The process of claim 4 wherein the polyhydric alcohol is pentaerythritol in an amount of 5–20% equivalent excess over the amount of rosin.

8. In an improved process for esterifying rosin with a polyhydric alcohol to make a tackifier for hot melt adhesives which comprises conducting the esterification reaction in an inert environment in the presence of from 0.05% to 2.0% phosphinic acid, based on the weight of the rosin, and from 0.05% to 1.0% of a phenol sulfide compound, based on the weight of the rosin, at a temperature of from about 180° C. to about 300° C. for a time required to achieve an ester product acid number of 15 or below and neutralizing the phosphinic acid, wherein the improvement comprises neutralizing the phosphinic acid by the addition to the esterified rosin of from 0.01% to 5.0% of a magnesium salt of an organic acid.

9. The process of claim 8 wherein the rosin is esterified with up to 50% excess equivalent of pentaerythritol in the presence of from 0.05% to 0.5% phosphinic acid and 0.2% to 0.5% of a phenol sulfide compound and the reaction is conducted under an inert gas sparge.

10. The process of claim 8 wherein the esterification reaction is conducted at a temperature of from 250° C. to 280° C.

11. The process of claim 9 wherein the inert gas is selected from the group consisting of carbon dioxide and nitrogen.

12. The process of claim 8 wherein the rosin is selected from the group consisting of tall oil rosin, gum rosin, and wood rosin.

13. The process of claim 8 wherein the rosin esterification is preceded by a rosin pretreatment step selected from the steps consisting of disproportionation, hydrogenation, polymerization, distillation, and a combination thereof.

14. The process of claim 9 wherein the polyhydric alcohol is pentaerythritol in an amount of 5–20% equivalent excess.

15. In a process for effecting rosin esterification which comprises reacting rosin with up to 50% equivalent excess of a polyhydric alcohol, based on the equivalent weight of the rosin, at a temperature ranging from 180° C. to 300° C., for a time required to achieve an ester product acid number of 15 or below in the presence of from 0.01% to 2.0% phosphinic acid and from 0.05% to 1.0% of a phenol sulfide compound of the structure:

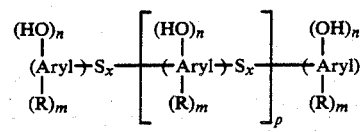

where n is an integer from 1 to 3, p is an integer from 0 to 100, x is 1 to 3, the sum of m and n on each aryl is from 1 to 5, aryl is selected from the group consisting of phenyl, naphthyl, and anthracyl, and R is a hydrocarbon radical of 1 to 22 carbon atoms, the improvement comprising neutralizing the esterified rosin with from 0.01% to 5.0% of a magnesium salt of an organic acid.

16. The process of claim 15 wherein the rosin is selected from the group consisting of tall oil rosin, gum rosin, and wood rosin.

17. The process of claim 15 wherein the polyhydric alcohol is pentaerythritol in an amount of 5–20% excess equivalent.

18. The process of claim 15 wherein the time required to achieve an ester product acid number of 15 or below is from 5 to 15 hours.

19. An improved tackifier for hot melt adhesives comprising a rosin ester prepared by the steps of
    (a) reacting molten rosin and a polyhydric alcohol in the presence of catalytic amount of phosphinic acid and a phenol sulfide compound in an inert environment, and (b) treating the rosin ester material with an amount of a magnesium salt of an organic acid to effectively neutralize the acidity contained therein.

20. The tackifier of claim 19 wherein the reaction is conducted in an inert environment for from about 5 to about 15 hours at from 180° C. to 300° C. in the presence of 0.01% to 2.0% phosphinic acid and 0.05% to 1.0% of a phenol sulfide compound, followed by a steam sparge and addition of from 0.01% to 5.0% of a magnesium salt of an organic acid.

21. The tackifier of claim 19 wherein the rosin is esterified with up to 50% excess equivalent of the polyhydric alcohol at from 250° C. to 280° C.

22. The tackifier of claim 19 wherein the rosin is selected from the group consisting of tall oil rosin, gum rosin and wood rosin.

23. The tackifier of claim 19 wherein the rosin esterification is preceded by a rosin pretreatment step selected from the steps consisting of disproportionation, hydrogenation, polymerization, distillation, and a combination thereof.

24. The tackifier of claim 21 wherein the polyhydric alcohol is pentaerythritol in an amount of 5-20% equivalent excess over the amount of rosin.

25. In a method of preparing a hot melt adhesive comprising a wax, a polymer, and a tackifier, the improvement of employing as the tackifier a rosin ester prepared by heating rosin in combination with a polyhydric alcohol in the presence of a catalytic amount of phosphinic acid and a phenol sulfide compound in an inert environment and subsequently treating the rosin ester product with an amount of a magnesium salt of an organic acid to effectively neutralize the acidity contained therein, thereby producing a hot melt adhesive of improved clarity and viscosity stability.

26. The process of claim 25 wherein the reaction is conducted in an inert environment for from about 5 to about 15 hours at from 180° C. to 300° C. in the presence of 0.01% to 2.0% phosphinic acid, based on the weight of the rosin and 0.05% to 1.0% of a phenol sulfide compound, based on the weight of the rosin, followed by a steam sparge and addition of from 0.01% to 5.0% of the magnesium salt.

27. The process of claim 26 wherein the reaction is first heated to a temperature of from about 225° C. to about 250° C. and held for about three hours, after which the reaction temperature is increased to about 275° C. and held for from about two to about twelve hours prior to the steam sparge.

28. The process of claim 25 wherein the rosin is esterified with up to 50% excess equivalent of the polyhydric alcohol, over the rosin, at from about 250° C. to about 280° C.

29. The process of claim 25 wherein the rosin is selected from the group consisting of tall oil rosin, gum rosin and wood rosin.

30. The process of claim 25 wherein the rosin esterification is preceded by a rosin pretreatment step selected from the steps consisting of disproportionation, hydrogenation, polymerization, distillation, and a combination thereof.

31. The process of claim 28 wherein the polyhydric alcohol is pentaerythritol in an amount of 5-20% equivalent excess over the amount of rosin.

* * * * *